United States Patent
Wiseman

(10) Patent No.: US 8,755,525 B2
(45) Date of Patent: Jun. 17, 2014

(54) QUANTUM KEY DISTRIBUTION INVOLVING MOVEABLE KEY DEVICE

(75) Inventor: Simon Robert Wiseman, Malvern (GB)

(73) Assignee: Qinetiq Limited, London (GB)

( * ) Notice: Subject to any disclaimer, the term of this patent is extended or adjusted under 35 U.S.C. 154(b) by 353 days.

(21) Appl. No.: 12/992,695

(22) PCT Filed: May 15, 2009

(86) PCT No.: PCT/GB2009/001226
§ 371 (c)(1),
(2), (4) Date: Nov. 15, 2010

(87) PCT Pub. No.: WO2009/141587
PCT Pub. Date: Nov. 26, 2009

(65) Prior Publication Data
US 2011/0064222 A1 Mar. 17, 2011

Related U.S. Application Data

(60) Provisional application No. 61/071,807, filed on May 19, 2008.

(30) Foreign Application Priority Data

May 19, 2008 (GB) .................................. 0809045.8

(51) Int. Cl.
*H04L 29/06* (2006.01)
*G06F 21/00* (2013.01)
*H04L 9/08* (2006.01)
*G06F 15/16* (2006.01)
*H04L 9/32* (2006.01)
*H04L 29/12* (2006.01)
*G06Q 99/00* (2006.01)

(52) U.S. Cl.
CPC ............ *H04L 9/0852* (2013.01); *H04L 9/0827* (2013.01); *H04L 9/0833* (2013.01); *H04L 9/0861* (2013.01)
USPC ........... 380/255; 380/256; 380/278; 380/279; 380/283; 380/286; 726/4; 713/171; 706/65

(58) Field of Classification Search
USPC ................. 380/255, 278, 283, 279, 256, 286; 726/4; 713/171; 705/65
See application file for complete search history.

(56) References Cited

U.S. PATENT DOCUMENTS 3,704,996 A 12/1972 Borner et al.
(Continued)

FOREIGN PATENT DOCUMENTS

EP 0 583 115 A1 2/1994
(Continued)

OTHER PUBLICATIONS

Chi-hang Fred Fung, Kiyoshi Tamaki, Bing Qi, Hoi-Kw&g Lo, Xi&gfeng Ma; "Security proof of quantum key distribution with detection efficiency mismatch"; Jan. 2009; ACM Quantum Information & Computation , vol. 9 Issue 1; pp. 131-165.*

(Continued)

*Primary Examiner* — Kambiz Zand
*Assistant Examiner* — Courtney Fields
(74) *Attorney, Agent, or Firm* — Oliff PLC

(57) ABSTRACT

A method of key distribution from a first entity to a second entity including the first entity communicating with a moveable key device so as to share a secret data with said moveable key device, relocating said moveable key device to a location having a quantum link with said second entity, transmitting a quantum signal from said moveable key device to said second entity on said quantum link, the quantum signal being based on said secret data; and said first entity and said second entity undertaking key agreement based on the quantum signal received by the second entity. Such a method allows the principles of quantum key distribution to be applied even in the absence of a suitable quantum communications link between the first and second entities.

20 Claims, 1 Drawing Sheet

(56) References Cited

U.S. PATENT DOCUMENTS

Figure 1:
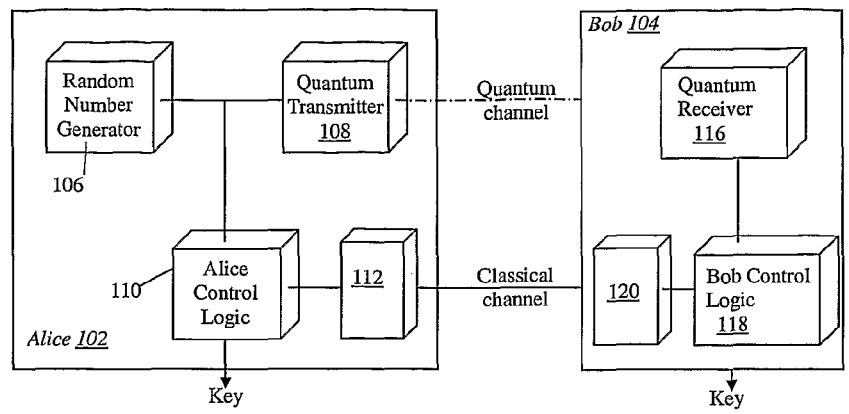

| | | | |
|---|---|---|---|
| 4,291,939 A | 9/1981 | Giallorenzi et al. | |
| 4,691,984 A | 9/1987 | Thaniyavarn | |
| 4,775,971 A | 10/1988 | Bergmann | |
| 4,807,952 A | 2/1989 | Jaeger et al. | |
| 4,846,540 A | 7/1989 | Kapon | |
| 5,150,436 A | 9/1992 | Jaeger et al. | |
| 5,157,754 A | 10/1992 | Bierlein et al. | |
| 5,166,991 A | 11/1992 | Jaeger et al. | |
| 5,410,625 A | 4/1995 | Jenkins et al. | |
| 5,414,789 A | 5/1995 | Tamil et al. | |
| 5,428,698 A | 6/1995 | Jenkins et al. | |
| 5,479,514 A | 12/1995 | Klonowski | |
| 5,481,636 A | 1/1996 | Fukuda et al. | |
| 5,566,257 A | 10/1996 | Jaeger et al. | |
| 5,644,664 A | 7/1997 | Burns et al. | |
| 5,757,912 A | 5/1998 | Blow | |
| 5,768,378 A | 6/1998 | Townsend et al. | |
| 5,878,142 A | 3/1999 | Caputo et al. | |
| 5,999,548 A | 12/1999 | Mori et al. | |
| 6,028,935 A | 2/2000 | Rarity et al. | |
| 6,145,079 A | 11/2000 | Mitty et al. | |
| 6,240,514 B1 | 5/2001 | Inoue et al. | |
| 6,717,708 B2 | 4/2004 | Prosyk | |
| 6,798,795 B2 | 9/2004 | Yoo | |
| 6,806,986 B2 | 10/2004 | Asobe et al. | |
| 7,068,790 B1 | 6/2006 | Elliott | |
| 7,155,078 B2 | 12/2006 | Welch et al. | |
| 7,162,107 B2 | 1/2007 | Bull et al. | |
| 7,181,114 B2 | 2/2007 | Lee et al. | |
| 7,242,775 B2 | 7/2007 | Vig et al. | |
| 7,242,821 B2 | 7/2007 | Bull et al. | |
| 7,248,695 B1 | 7/2007 | Beal et al. | |
| 7,274,791 B2 | 9/2007 | Van Enk | |
| 7,289,688 B2 | 10/2007 | Bull et al. | |
| 7,430,295 B1 | 9/2008 | Pearson et al. | |
| 7,457,416 B1 | 11/2008 | Elliott | |
| 7,460,670 B1 | 12/2008 | Elliott | |
| 7,515,716 B1 | 4/2009 | Elliott | |
| 7,515,801 B2 | 4/2009 | McCaughan et al. | |
| 7,596,318 B2 | 9/2009 | Han et al. | |
| 7,627,126 B1* | 12/2009 | Pikalo et al. | 380/279 |
| 7,646,873 B2* | 1/2010 | Lee et al. | 380/277 |
| 7,706,535 B1 | 4/2010 | Pearson et al. | |
| 7,760,883 B2 | 7/2010 | Kuang | |
| 7,864,958 B2 | 1/2011 | Harrison et al. | |
| 7,865,048 B2 | 1/2011 | McCaughan et al. | |
| 8,054,976 B2 | 11/2011 | Harrison et al. | |
| 8,488,790 B2 | 7/2013 | Wellbrock et al. | |
| 2002/0025046 A1 | 2/2002 | Lin | |
| 2002/0087862 A1 | 7/2002 | Jain et al. | |
| 2003/0210912 A1 | 11/2003 | Leuthold et al. | |
| 2003/0214991 A1 | 11/2003 | Wiedmann et al. | |
| 2004/0032954 A1 | 2/2004 | Bonfrate et al. | |
| 2004/0034776 A1 | 2/2004 | Fernando et al. | |
| 2004/0109564 A1* | 6/2004 | Cerf et al. | 380/256 |
| 2004/0184603 A1 | 9/2004 | Pearson et al. | |
| 2004/0184615 A1* | 9/2004 | Elliott et al. | 380/283 |
| 2004/0252957 A1 | 12/2004 | Schmidt et al. | |
| 2005/0078826 A1 | 4/2005 | Takeuchi | |
| 2005/0135620 A1 | 6/2005 | Kastella et al. | |
| 2005/0190921 A1 | 9/2005 | Schlafer et al. | |
| 2005/0249352 A1 | 11/2005 | Choi et al. | |
| 2005/0259825 A1 | 11/2005 | Trifonov | |
| 2005/0286723 A1 | 12/2005 | Vig et al. | |
| 2006/0002563 A1 | 1/2006 | Bussieres et al. | |
| 2006/0031828 A1 | 2/2006 | Won et al. | |
| 2006/0059343 A1 | 3/2006 | Berzanskis et al. | |
| 2006/0062392 A1 | 3/2006 | Lee et al. | |
| 2006/0067603 A1 | 3/2006 | Bull et al. | |
| 2006/0083379 A1* | 4/2006 | Brookner | 380/286 |
| 2006/0290941 A1 | 12/2006 | Kesler et al. | |
| 2007/0014415 A1 | 1/2007 | Harrison et al. | |
| 2007/0016534 A1* | 1/2007 | Harrison et al. | 705/65 |
| 2007/0065154 A1 | 3/2007 | Luo et al. | |
| 2007/0065155 A1 | 3/2007 | Luo et al. | |
| 2007/0071245 A1 | 3/2007 | Kuang | |
| 2007/0074277 A1 | 3/2007 | Tofts et al. | |
| 2007/0076884 A1 | 4/2007 | Wellbrock et al. | |
| 2007/0101410 A1* | 5/2007 | Harrison et al. | 726/4 |
| 2007/0104443 A1 | 5/2007 | Helmy | |
| 2007/0122097 A1 | 5/2007 | Schmidt et al. | |
| 2007/0123869 A1 | 5/2007 | Chin et al. | |
| 2007/0130455 A1 | 6/2007 | Elliott | |
| 2007/0133798 A1 | 6/2007 | Elliott | |
| 2007/0160201 A1 | 7/2007 | Blom et al. | |
| 2007/0177735 A1* | 8/2007 | Mimih et al. | 380/256 |
| 2007/0192598 A1 | 8/2007 | Troxel et al. | |
| 2008/0003104 A1 | 1/2008 | Betlach | |
| 2008/0013738 A1 | 1/2008 | Tajima et al. | |
| 2008/0031456 A1 | 2/2008 | Harrison et al. | |
| 2008/0137858 A1 | 6/2008 | Gelfond et al. | |
| 2008/0144836 A1 | 6/2008 | Sanders et al. | |
| 2008/0147820 A1 | 6/2008 | Maeda et al. | |
| 2008/0175385 A1 | 7/2008 | Lee et al. | |
| 2008/0292095 A1 | 11/2008 | Vig et al. | |
| 2008/0317423 A1 | 12/2008 | Stepanov et al. | |
| 2009/0016736 A1 | 1/2009 | Beal et al. | |
| 2009/0074192 A1 | 3/2009 | Beal et al. | |
| 2009/0106551 A1 | 4/2009 | Boren et al. | |
| 2009/0175452 A1 | 7/2009 | Gelfond et al. | |
| 2009/0316910 A1 | 12/2009 | Maeda et al. | |
| 2010/0098252 A1 | 4/2010 | Kanter et al. | |
| 2010/0226659 A1 | 9/2010 | Nishioka et al. | |
| 2010/0290626 A1 | 11/2010 | Jenkins et al. | |
| 2010/0293380 A1 | 11/2010 | Wiseman et al. | |
| 2010/0299526 A1 | 11/2010 | Wiseman | |
| 2010/0329459 A1 | 12/2010 | Wiseman et al. | |

FOREIGN PATENT DOCUMENTS

| | | | |
|---|---|---|---|
| EP | 0 610 727 A1 | 8/1994 | |
| EP | 1 503 328 A1 | 2/2005 | |
| EP | 1 605 287 A2 | 12/2005 | |
| EP | 1 633 076 A1 | 3/2006 | |
| EP | 1 643 663 A1 | 5/2006 | |
| EP | 1715615 A1 * | 10/2006 | |
| EP | 1 833 009 A1 | 9/2007 | |
| EP | 1848142 A2 | 10/2007 | |
| EP | 1 865 656 A1 | 12/2007 | |
| EP | 2 003 812 A2 | 12/2008 | |
| EP | 2081317 A2 | 7/2009 | |
| GB | 2 379 847 A | 3/2003 | |
| GB | 2 397 452 A | 7/2004 | |
| GB | 2 427 336 A | 12/2006 | |
| GB | 2 453 471 A | 4/2009 | |
| JP | A-2005-117511 | 4/2005 | |
| JP | A-2005-268958 | 9/2005 | |
| JP | A-2007-500370 | 1/2007 | |
| JP | A-2007-053591 | 3/2007 | |
| JP | 2007129562 A * | 5/2007 | |
| JP | A-2007-129562 | 5/2007 | |
| WO | WO 92/11550 A1 | 7/1992 | |
| WO | WO 92/11551 A1 | 7/1992 | |
| WO | WO 92/11554 A1 | 7/1992 | |
| WO | WO 92/11555 A1 | 7/1992 | |
| WO | WO 95/07582 A1 | 3/1995 | |
| WO | WO 97/44936 A1 | 11/1997 | |
| WO | WO 02/15626 A1 | 2/2002 | |
| WO | WO 03/015370 A2 | 2/2003 | |
| WO | WO 03/065091 A2 | 8/2003 | |
| WO | WO 2004/083915 A1 | 9/2004 | |
| WO | WO 2004/083923 A1 | 9/2004 | |
| WO | WO 2004/105289 A3 | 12/2004 | |
| WO | WO 2005/012968 A1 | 2/2005 | |
| WO | WO 2005/012970 A1 | 2/2005 | |
| WO | WO 2006/031828 A2 | 3/2006 | |
| WO | WO 2006/134290 A2 | 12/2006 | |
| WO | WO 2007/023286 A1 | 3/2007 | |
| WO | WO 2007-105834 A1 | 9/2007 | |
| WO | WO 2007/121587 A1 | 11/2007 | |
| WO | WO 2007/123869 A2 | 11/2007 | |
| WO | WO 2008/003104 A1 | 1/2008 | |
| WO | WO 2008/032048 A1 | 3/2008 | |
| WO | WO 2008/146395 A1 | 12/2008 | |

(56) References Cited

FOREIGN PATENT DOCUMENTS

| WO | WO 2009/001226 A3 | 12/2008 |
|---|---|---|
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Bennett et al., "Quantum Cryptography: Public Key Distribution and Coin Tossing," International Conference on Computers, Systems & Signal Processing, Dec. 10-12, 1984, pp. 1-5, Bangalore, India.

Bechmann-Pasquinucci et al., "Quantum key distribution with trusted quantum relay," May 13, 2005, pp. 1-13, http://arxiv.org/PS_cache/quant-ph/pdf/0505/0505089v1.pdf>.

Duligall et al., "Low cost and compact quantum key distribution," New Journal of Physics, Oct. 24, 2006, pp. 1-16, vol. 8, No. 10, IOP Publishing Ltd and Deutsche Physikalische Gesellschaft.

International Search Report of International Patent Application No. PCT/GB2009/001226, mailed on Jul. 14, 2009.

Written Opinion of International Patent Application No. PCT/GB2009/001226, mailed on Jul. 14, 2009.

Elliott, "Building the quantum network," New Journal of Physics 4, pp. 46.1-46.12, 2002, XP-002271991.

Fernandez et al., "Gigahertz Clocked Quantum Key Distribution in Passive Optical Networks," Leos Summer Topical Metings, 2006 Digest of the Quebec City, Canada, Jul. 17, 2006, pp. 36-37, XP-010940123.

Fernandez et al., "Passive Optical Network Approach to GigahertzClocked Multiuser Quantum Key Distribution," Journal of Quantum Electronics, vol. 43, No. 2, pp. 130-138, Feb. 2007.

Brassard et al., "Multi-User Quantum Key Distribution Using Wavelength Division Multiplexing," pp. 1-5, XP-002534322, <http://citeseerx.ist.psu.edu/viewdoc/download?doi=10.1.187.378&rep=rep1&type=pdf>.

Gordeev et al., "Tunable electro-optic polarization modulator for quantum key distribution applicators,"Optics Communications, vol. 234, pp. 203-210, 2004.

Horikiri et al., "Quantum key distribution with a heralded single photon source," International Quantum Electronics Conference, 2005, pp. 1617-1618, Jul. 11, 2005.

Lee et al., "Quantum Authentication and Quantum Key Distribution Protocol," Jan. 11, 2006, pp. 1-8, <http://arxiv.org/PS_cache/quant-ph/pdf/0510/0510144v2.pdf>.

Rao et al., "Nonlinear frequency conversion in semiconductor optical waveguides using birefringent, modal and quasiphase-matching techniques," Journal of Optics A: Pure and Applied Optics, vol. 6, pp. 569-584, 2004.

Karlsson et al., "Authority-based user authentication in quantum key distribution," Physical Review A , vol. 62, pp. 022305-1-022305-7, 2000, XP-002534291.

Kuhn, "A Quantum Cryptographic Protocal with Detection of Compromised Server," Quantum Information and Computation, vol. 5, No. 7, pp. 551-560, 2005, XP-002520284.

Kumavor et al., "Comparison of Four Multi-User Quantum Key Distribution Schemes Over Passive Optical Networks," Journal of Lightwave Technology, vol. 23, No. 1, pp. 268-276, Jan. 2005, XP-001227328.

Malis et al., "Improvement of second-harmonic generation in quantum-cascade lasers with true phase matching," Applied Physics Letters, vol. 84, No. 15, pp. 2721-2723, Apr. 12, 2004.

Mašanović et al., "Design and Performance of a Monolithically Integrated Widely Tunable AHOptical Wavelength Converter With Independent Phase Control," IEEE Photonics Technology Letters, vol. 196, No. 10, pp. 2299-2301, Oct. 2004.

Menezes, Handbook of Applied Cryptography, Chapter 13 Key Management Techniques, CRC Press LLC, pp. 547553, 1997, XP-002520285.

Nambu et al., "BB84 Quantum Key Distribution System based on Silica-Based Planar Lightwave Circuits," Apr. 22, 2008, pp. 1-11, <http://arxiv.org/PS_cache/quant-ph/pdf/0404/0404015.pdf>.

Hwang et al., "Provably Secure ThreeParty Authenticated Quantum Key Distribution Protocols," IEEE Transactions on Dependable and Secure Computing, vol. 4, No. 1, pp. 71-80, Jan.-Mar. 2007.

Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.

Nguyen et al., "802.11i Encryption Key Distribution Using Quantum Cryptography," Journal of Networks, vol. 1, No. 5, pp. 9-20, Sep./Oct. 2006, XP-002576733.

Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.

Jäger et al., "Modal dispersion phase matching over 7 mm length in overdamped polymeric channel waveguides," Applied Physics Letters, vol. 69, No. 27, pp. 4139-4141, Dec. 30, 1996.

Yin et al., "Integrated ARROW waveguides with hollow cores," Optics Express, vol. 12, No. 12, pp. 2710-2715, Jun. 14, 2004, XP-002363659.

Yariv, "Coupled-Mode Theory for Guided-Wave Optics," IEEE Journal of Quantum Electronics, vol. QE-9, No. 9, pp. 919-933, Sep. 1973.

Rahmatian, "An Ultrahigh-Speed AlGaAs-GaAs Polarization Converter Using Slow-Wave Coplanar Electrodes," IEEE Photonics Technology Letters, vol. 10, No. 5, pp. 675-677, May 1998.

Finlayson et al., "Polarization Conversion in Passive DeepEtched GaAs/AlGaAs Waveguides," Journal of Lightwave Technology, vol. 24, No. 3, pp. 1425-1432, Mar. 2006, XP-002459136.

Grossard et al., "AlGaAs-GaAs Polarization Converter with Electrooptic Phase Mismatch Control," IEEE Photonics Technology Letters, vol. 13, No. 8, pp. 830-832, Aug. 2001.

Hall et al., "Optical Guiding and Electro-Optic Modulation in GaAs Epitaxial Layers," Optics Communications, vol. 1, No. 9, pp. 403-405, Apr. 1970.

Haxha et al., "Analysis of polarization conversion in AlGaAs/GaAs electrooptic polarization converter," Optics Communications, vol. 262, pp. 47-56, 2006, XP-002459135.

Heaton et al., "Optimization of Deep-Etched, Single-Mode GaAs/AlGaAs Optical Waveguides Using Controlled Leakage into he Substrate," Journal of Lightwave Technology, vol. 17, No. 2, pp. 267-281, Feb. 1999.

Izuhara et al., "Low-voltage tunable TE/TM converter on ion-sliced lithium niobate thin film," Electronic Letters, vol. 39, No. 15, Jul. 24, 2003.

Schlak et al., "Tunable TE/TM-Mode Converter on (001)-InP-Substrate," IEEE Photonics Technology Letters, vol. 3, No. 1, pp. 15-16, Jan. 1991.

Wang et al., "High Speed III-V Electooptic Waveguide Modulators at $\lambda=1.3$ μm," Journal of Lightwave Technology, vol. 6, No. 6, pp. 758-771, Jun. 1988.

Mar. 31, 2009 International Search Report issued in Application No. PCT/GB2009/000190.

Mar. 31, 2009 Written Opinion issued in Application No. PCT/GB2009/000190.

May 16, 2008 British Search Report issued in Application No. GB0801408.6.

Jul. 14, 2009 International Search Report issued in Application No. PCT/GB2009/000189.

Jul. 14, 2009 Written Opinion issued in Application No. PCT/GB2009/000189.

Aug. 3, 2010 International Preliminary Report on Patentability issued in Application No. PCT/GB2009/000179.

Jun. 2, 2009 International Search Report issued in Application No. PCT/GB2009/000179.

Jun. 2, 2009 Written Opinion issued in Application No. PCT/GB2009/000179.

Apr. 24, 2008 British Search Report issued in Application No. GB0801492.0.

Jul. 28, 2009 International Search Report issued in Application No. PCT/GB2009/000186.

Jul. 28, 2009 Written Opinion issued in Application No. PCT/GB2009/000186.

(56) References Cited

OTHER PUBLICATIONS

May 21, 2008 British Search Report issued in Application No. GB0801395.5.
Jul. 14, 2009 International Search Report issued in Application No. PCT/GB2009/001223.
Jul. 14, 2009 Written Opinion issued in Application No. PCT/GB2009/001223.
Jul. 6, 2009 International Search Report issued in Application No. PCT/GB2009/001222.
Jul. 6, 2009 Written Opinion issued in Application No. PCT/GB2009/001222.
U.S. Appl. No. 12/993,146, filed Nov. 17, 2010; Hicks.
U.S. Appl. No. 12/993,098, filed Nov. 17, 2010; Wiseman et al.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Jun. 1, 2011 International Search Report issued in Application No. PCT/GB2010/001811.
Jun. 1, 2011 Written Opinion issued in Application No. PCT/GB2010/001811.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
Office Action dated May 11, 2012 issued in U.S. Appl. No. 12/812,849.
Stucki et al., "Quantum Key Distribution Over 67km With Plug &Play System," New Journal of Physics 4, pp. 41.1-41.8, 2002.
Oct. 29, 2012 Office Action issued in U.S. Appl. No. 12/993,146.
Nov. 8, 2012 Office Action issued in U.S. Appl. No. 12/863,510.
Nov. 9, 2012 Office Action issued in U.S. Appl. No. 13/130,790.
Rass, S., "A Method of Authentication for Quantum Networks", PWASET, vol. 12, Mar. 2006; ISSN 1307-6884, pp. 149-154.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Kanamori et al., "3 Party Quantum Authenticated Key Distribution with Partially Trusted Third Party," IEEE Communications Society, 2008, Globecom 2008 Proceedings.
Le et al. "Enhancement of AGT Telecommunication Security using Quantum Cryptography," Ecole Nationale Superieure des Telecommunications, Eurocontrol CARE Project, QCRYPT, France.
Lütkenhaus, "Estimates for Practical Quantum Cryptography," Helsinki Institute of Physics, Feb. 1, 2008, pp. 1-26, Helsinki, Finland.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in International Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Aug. 1, 2012 Office Action issued in U.S. Appl. No. 12/993,098.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No. 12/863,510.
Sep. 21, 2012 Office Action issued in U.S. Appl. No. 12/812,849.
Oct. 4, 2012 Office Action issued in U.S. Appl. No. 12/992,695.
U.S. Appl. No. 13/496,324 in the name of Ayling, filed Mar. 15, 2012.
U.S. Appl. No. 12/863,483 in the name of Wiseman, filed Jul. 19, 2010.
U.S. Appl. No. 12/863,509 in the name of Jenkins, filed Jul. 19, 2010.
U.S. Appl. No. 13/130,944 in the name of Benton, filed May 24, 2011.
U.S. Appl. No. 13/130,897 in the name of Wiseman, filed May 24, 2011.
U.S. Appl. No. 13/130,790 in the name of Wiseman, filed May 24, 2011.
U.S. Appl. No. 13/125,735 in the name of Wiseman, filed Apr. 22, 2011.
Nov. 16, 2012 Office Action issued in U.S. Appl. No. 13/130,897.
Jan. 3, 2013 Office Action issued in U.S. Appl. No. 13/125,735.
Jan. 18, 2013 Office Action issued in U.S. Appl. No. 12/993,098.
Feb. 11, 2013 Notice of Allowance issued in U.S. Appl. No. 12/863,483.
Apr. 11, 2013 Office Action issued in U.S. Appl. No. 13/130,944.
May 10, 2013 Office Action issued in U.S. Appl. No. 13/130,897.
Ibrahim et al., "Simulation of Static Optical XPM in Active MMI Couplers," (published in International Conference on Numerical Simulation of Optoelectronic Devices, Sep. 2007), pp. 95-96.
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in U.S. Appl. No. 13/496,324.
English Language Version of Apr. 30, 2013 Japanese Office Action issued in Japanese Patent Application No. 2010-543567.
Nov. 5, 2013 Office Action issued in U.S. Appl. No. 12/863,510.
Nov. 7, 2013 Office Action issued in U.S. Appl. No. 12/993,098.
Ma et al, Experimental Demonstration of an Active Quantum Key Distribution Network with Over Gbps Clock Synchronization (published in IEEE Communications Letters, vol. 11, No. 12, Dec. 2007).
Sep. 12, 2013 Office Action issued in U.S. Appl. No. 13/130,897.
Sep. 18, 2013 Office Action issued in U.S. Appl. No. 12/812,849.
Jan. 17, 2014 Notice of Allowance issued in U.S. Appl. No. 13/130,944.
John P. Barber; Integrated hollow and solid-core waveguides for sensor platforms; Year: 2005; OSA/IPRA; p. 1-3.
Office Action dated Mar. 25, 2014 issued in U.S. Appl. No. 12/863,509.
Apr. 7, 2014 Office Action issued in U.S. Appl. No. 12/812,849.

\* cited by examiner

QUANTUM KEY DISTRIBUTION INVOLVING MOVEABLE KEY DEVICE

This invention relates to apparatus and methods for secure transfer of key material which can be used for encryption, in particular to apparatus and methods involving quantum key distribution.

Encryption is commonly used to protect communications over a variety of media, especially communication networks and/or data networks. Encryption is generally based on the parties who wish to protect their communication sharing some secret value. This value may be used to derive a cryptographic key which is used to protect the communication. The more sophisticated the encryption the harder it is to decode without the key—it is generally believed that breaking modern, well administered encryption schemes would require vast conventional computing resources. It is well known however that using the same cryptographic key repeatedly for different communications gives a possible codebreaker more material to work with and potentially introduces vulnerabilities into the encryption. Therefore changing the cryptographic key often is desirable.

Obviously distributing new key material securely is vital as, with knowledge of the key, an eavesdropper can decrypt all communications. Key distribution must also be efficient and convenient however.

New key material may be distributed by encrypting it using the existing key and then distributing as normal data traffic. The new key material can then be used for subsequent communications—including, at some point, another new key. Such a scheme is convenient and allows regular key update but it has a weakness in that if the encryption is broken at any point, i.e. the encryption key is effectively determined, it fails from that point on as an eavesdropper will be able to intercept and decode the message bearing the new key when it is distributed and use that key to intercept future communications.

Quantum key distribution (QKD) is a well known technique which offers the possibility of secure key distribution. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution.

Bennett and Brassard described a QKD protocol in C. H. Bennett and G. Brassard, "Quantum cryptography: 'Public key distribution and coin tossing'," IEE Conf. Computers Systems Signal Processing, Bangalore, India 1984 which has become known as the BB84 protocol. This protocol uses the transmission of a suitably encoded series of single photons (a quantum exchange) followed by an open discussion via any conventional communication medium (a key agreement stage) to allow Alice and Bob to derive a shared string of random numbers. As single photons are used in the quantum exchange the only way Eve can gain any information about this exchange is to intercept the single photons sent by Alice and measure the information herself. To avoid detection she should also transmit a photon to Bob which attempts to replicate the original photon she intercepted. Due to the random choice of encoding and the quantum nature of the photons Eve can not guarantee to pass a correctly encoded photon to Bob and this will generate a statistical error which will be spotted by Alice and Bob during their conventional communication.

QKD therefore offers a secure means of distributing new key material which protects against eavesdropping. The BB84 protocol as originally described is however potentially vulnerable to a so called man-in-the-middle attack. Here an attacker, usually referred to as Mallory, positions himself so as to be able to intercept and stop all data exchange between Alice and Bob. Mallory then communicates with Alice but pretends to Alice that he is Bob. He also communicates with Bob but in doing so pretends to be Alice. Thus each of Alice and Bob think they are talking to one another but in fact they are actually both talking to Mallory. Were simple QKD protocols used in this scenario Alice would agree a quantum key, i.e. a key derived through QKD, with Mallory (thinking it was Bob). Bob would likewise agree a quantum key with Mallory. Alice, thinking she had agreed a quantum key with Bob would encrypt a message meant for Bob with this key. Mallory could intercept this communication, decrypt it and take any information he wants from the message. To avoid detection he can then re-encrypt this message, this time using the quantum key agreed with Bob, and transmit it onward to Bob. Bob would therefore receive the message which was actually sent by Alice and it would be encrypted using the key he thinks he has agreed with Alice. Bob would therefore not realise anything was wrong. Communications from Bob to Alice would follow the same principle in reverse order.

To overcome the man-in-the-middle attack it is usual for the communicating parties to undertake an authentication step to ensure that Alice is indeed talking to Bob and not to Mallory. Authentication usually involves revealing or using a shared secret, such as an identity key, which is known only to Bob and Alice. Alice, wishing to communicate with Bob, would attempt to contact Bob and set up a quantum key. In doing so she requests authentication based on Bob's identity key. Mallory would not know this and hence could not successfully pretend to be Bob. Similarly Bob, receiving a request to set up a quantum key with someone purporting to be Alice, would request authentication based on Alice's identity key. Authentication does require Alice and Bob to share knowledge of at least one identity key prior to commencing QKD but this key can be supplied once on initialisation of the system. In use the identity key can then be updated using a quantum key derived from an authenticated QKD session.

Authenticated QKD therefore offers secure key distribution. QKD as described however requires an uninterrupted optical path from Alice to Bob to act as a quantum channel. This may be in free space or through an optical waveguide such as a fibre optic cable. In either case distances are limited, not least due to the use of single photons.

One way of overcoming this limitation would be to form a chain of nodes, each node being connected to the next node by an optical link over which QKD can be applied. The use of nodes introduces additional problems of trust and authentication in that each node must be trusted and authenticated for the network to remain secure.

For certain situations the QKD infrastructure might not exist across the whole of the desired network path. Current QKD systems can successfully transmit signals through hundreds of kilometers of optical fibre but communication across oceans would requires thousands of kilometers of fibre and undersea nodes would be expensive to provide and maintain. Free space based QKD with satellites has also been proposed but is not yet available reliably for large scale communications.

It is therefore an object of the present invention to provide secure distribution of key material between two locations which need not be linked by a chain of quantum links.

Thus according to the present invention there is provided a method of key distribution from a first entity to a second entity comprising the steps of: the first entity communicating with a moveable key device so as to share a secret data with said moveable key device, relocating said moveable key device to a location having a quantum link with said second entity, transmitting a quantum signal from said moveable key device to said second entity on said quantum link, the quantum signal being based on said secret data string; and said first entity and said second entity undertaking key agreement based on the quantum signal received by the second entity.

The method of the present invention thus involves use of a moveable key device and allows the principles of quantum key distribution (QKD) to be applied even in the absence of a suitable quantum communications link between the first and second entities. In a first location the first entity communicates with the moveable key device so as to share a secret data. At this first location the moveable key device will not have a quantum link to the second entity. The communication between the first entity and the moveable key device ensures that the moveable key device contains data, for example one or more random number strings, which is also known to the first entity. Thus at the end of the communication the moveable key device is, in effect, loaded with secret data which can be used as the basis of a quantum signal transmission and which is known to the first entity. The secret data is preferably transmitted from the first entity to the moveable key device. The secret data can be generated by the moveable key device and transmitted to the first entity but for most applications this is not preferred as the first entity loses control of generation of the secret data.

The moveable key device is then relocated to a location which does have a quantum link to the second entity. A quantum link as used herein means a link suitable for exchange of the quantum signal. It may, for instance, comprise a free space path or a path through a suitable waveguide or waveguides such as fibre optic cable.

Once the quantum link between the moveable key device and the second entity is established the moveable key device then transmits a quantum signal to the second entity. A quantum signal is any signal which may be used as the basis of a quantum key agreement protocol as would be understood by one skilled in the art. For instance the quantum signal may comprise a series of suitably modulated single photons. The skilled person will be well aware of various modulation schemes which may be used, for instance phase modulation or polarisation modulation. In the method of the present invention the secret data held within the moveable key device is used to determine the modulation applied to the quantum signal. For instance the secret data may comprise one or more random strings of binary numbers. Each pair of binary numbers in a string could be used to choose the encoding basis and data value for a transmitted single photon according to the BB84 protocol for example. The secret data may be used directed to determine the modulation or the secret data may be processed in a predetermined manner to generate data used to modulate the quantum signal, for instance the secret data may be used a seed in a known pseudo-random number generator. As the skilled person will appreciate a pseudo-random number generator acts on a string of seed data to produce a longer output. The output is pseudo random in that the same seed used in the same pseudo random number generator will always produce the same result. Therefore if the first entity and the moveable key device shared the same seed data and had the same pseudo random number generator they could generate the same longer string of data. This could reduce the amount of storage space needed within the moveable key device.

The exchange between the moveable key device and the second entity therefore represents a quantum signal exchange step as is conventional in QKD with the moveable key device being the transmitter.

However unlike conventional QKD, in the method of the present invention the moveable key device does not take part in a subsequent key agreement step with the second entity. Instead the first entity undertakes the subsequent key agreement step with the second entity. The first entity knows the secret data contained within the moveable key device and hence knows the modulation applied to quantum signal transmitted by the moveable key device. Thus the first entity in effect knows exactly the quantum signal transmitted by the moveable key device and thus can take part in a subsequent QKD key agreement step with the second entity.

As an example, the quantum signal transmission and detection and subsequent key agreement may be carried out in accordance with the principles of quantum exchange set out in the BB84 protocol, i.e. the quantum signal consists of a series of single photons, each randomly modulated in terms of encoding base and data value. The moveable key device uses the stored secret data to determine the modulation basis and data value to be applied to each photon. The first entity shares this secret data with the moveable device and hence also knows the encoding base applied and data value for each photon transmitted by the moveable key device. The first entity thus has all the information required to undertake the key agreement stage of the BB84 protocol. The skilled person will of course appreciate that the BB84 protocol is used by way of example only and other protocols exist and could be adapted to operate according to the present invention. For example, and without limitation, protocols such as the B92 protocol or six-state protocol could be adopted.

The present invention therefore allows a first entity, which does not have a quantum link with a second entity, to use QKD to agree key material with the second entity with all the advantages thereof. The term entity as used herein describes any device or apparatus, whether under direct human control or automatic, which is capable of communication as described herein. Thus the first and second entities may, without restriction, comprises computer workstations, servers, desktop PCs, communication stations, telephone stations etc.

It should be noted that the method of the present invention does not rely on the moveable key device actually performing full QKD, i.e. actually agreeing a key with second entity. In effect the moveable key device acts as part of a QKD apparatus of the first entity which can be distributed remotely. The first entity performs the key agreement step with the second entity and thus it is the first entity and second entity which ultimately agree a key. Importantly this means that the first entity performs authentication of the second entity—and vice versa. As mentioned above authentication is an important part of the key agreement step in QKD to ensure that the two entities taking part in the key agreement are who they say they are. This prevents a man in the middle type attack from being successful.

As the first and second entities mutually authenticate each other, neither has to trust the moveable key device to perform authentication on their behalf. Also this means that the moveable key device need not store any identity keys or other information needed for authentication. This not only simplifies the data that the moveable key device must store but also reduces the impact if the moveable key device were somehow compromised.

The quantum nature of the transmission between the moveable key device and the second entity means that this transmission is secure from eavesdropping. As is well known, in a well adjusted QKD system any attempt to eavesdrop on the quantum transmission will introduce errors into the transmission which can be detected. Thus the quantum signal transmission between the moveable key device and the second entity is secure. Further as mentioned as the first and second entity mutually authenticate the transmission is also secure against a man in the middle attack. Should the moveable key device end up transmitting the quantum signal to an entity other than the second entity, i.e. other than the intended recipient, whether deliberately arranged or accidentally, such a recipient could pretend to be the second entity and try to agree a key with the first entity but such attempt would fail at the authentication stage.

However it is important that the moveable key device uses the secret data once and only once. Were the moveable key device to use the same secret data more than once there is a risk that an eavesdropper could intercept at least one transmission and make measurements unknown to either the first or second entity. If such an eavesdropper then listened in to the key agreement step they may be able to determine some or all of the key finally agreed. Preferably therefore the method involves the step of ensuring that the moveable key device transmits a quantum signal based on the secret data once and only once This could be achieved by a control within the moveable key device monitoring whether or not the quantum signal has been transmitted or not and/or the method may involve the step of deleting the secret data as it is used.

It is also important that the secret data can not be determined from the moveable key device by other means. It is therefore preferable to ensure that the moveable key device is shielded from any kind of stray emission when operational and also shielded from probing to determine the secret data. Preferably the moveable key device comprises a secure, tamper proof housing. Tamper proofing of cryptographic components is well known and usually such tamper proof involves arranging the device such that if opened by any means or breached in any way the device will irretrievably delete all data stored therein.

It is also important that the communication between the first entity and the moveable key device is secure, i.e. proof against eavesdropping. This may not be a concern in some applications, for instance if the physical or geographical arrangement of the moveable key device and first entity means that the link between the first remote node and the first quantum node is secure, e.g. within a secured environment, open communication on such a link would be acceptable. This may be the case for instance where the moveable key device is a small portable device that can be easily located in the same environment as the first entity.

However in some cases it will be desirable to encrypt the communication between the first entity and the moveable key device so as to protect it from eavesdropping. The encryption applied to this communication could be any type of encryption which offers the security required for the particular application and the skilled person will be well aware of a variety of encryption techniques that could be used. Conveniently however the communication between the first entity and the moveable key device is protected by encrypting it with a quantum key derived by quantum key distribution between the first entity and the moveable key device. This preserves the security of QKD for the whole communication process.

Where there is a suitable quantum link between the first entity and the moveable key device standard QKD techniques may be applied to derive the quantum key, e.g. the standard authenticated BB84 protocol may be applied between the first entity and the moveable key device—or any other suitable QKD protocol. The method may therefore involve an initial step of deriving a quantum key between the first entity and the moveable key device by quantum key distribution.

The method therefore establishes a first quantum key between the first entity and the moveable key device by QKD. Once this first quantum key is established it can be used to encrypt communication between the first entity and the moveable key device so as to allow the first entity to transmit the secret data to the moveable key device or vice versa (although generally the first entity would prefer to generate or choose the secret data rather than rely on the moveable key device). Alternatively the first quantum key could be used as the secret data provided that it was sufficiently long enough. In this case the first quantum key is not used as a key per se but nevertheless is later used as a key for determining the quantum signal transmitted by the moveable key device to the second entity.

If the first entity and moveable key device do use QKD to agree a first quantum key the moveable key device will have a QKD transmitter or receiver. It will be appreciated that the moveable key device must posses a quantum signal transmitter operable to produce a signal based on the secret data when transmitting to the second entity and this transmitter may also be adapted to be used for QKD with the first entity. In which case the quantum transmitter of the moveable key device will have its own random number generator—the output of which is used as the basis of modulating the quantum signal transmitted in performing QKD with the first entity. Alternatively the moveable key device may have a QKD receiver for receiving signals transmitted from the first entity and a separate quantum signal transmitter for transmitting the quantum signal to the second entity.

Whilst there may conveniently be a direct quantum link between the moveable key device and the first entity for performing QKD between them, in some arrangements there may only be a series of quantum links via one or more quantum nodes. As mentioned above there are a variety of known methods for QKD across a series of quantum nodes. Preferably however in such a situation the step of establishing a quantum key between the first entity and the moveable key device uses the method of co-pending patent application GB0801406.0 the contents of which are incorporated herein by reference. This patent application describes a method of quantum key distribution, comprising a quantum exchange step between first and second quantum nodes and a subsequent key agreement step wherein, in the quantum exchange step, a first quantum node and a second quantum node exchange a quantum signal over a quantum link between them and wherein the first quantum node communicates with a first remote node such that the first remote node has information regarding the quantum signal transmitted and/or detected by the first node and the first remote node takes the place of the first quantum node in the subsequent key agreement step.

To understand this method imagine the moveable key device is linked to the first entity via a quantum node, i.e. there is a direct quantum link between the moveable key device and the quantum node and a separate quantum link between the quantum node and the first entity. The quantum node exchanges a quantum signal with the moveable key device. The quantum node also communicates, either before or after said quantum exchange, with the first entity so that the first entity knows the details of the quantum signal transmitted or received by the quantum node. The first entity then performs key agreement direct with the moveable key device. In a prior step, to secure the communications between the quantum node and the first entity, conventional QKD may have been performed over that link.

The method described in GB0801406.0 is therefore is similar to the method of the present invention in that a first entity establishes communications with a remote device, i.e. the quantum node, such that the first entity has knowledge of a quantum signal transmitted to or received from a further remote device, i.e. the moveable key device. In the method of the present invention the remote device is the moveable key device and the further remote device is the second entity. The moveable key device can therefore be seen as operating in the same fashion as a node in the method described in GB0801406.0 but in the method of the present invention the moveable key device is physically relocated to overcome a break in the chain of quantum links.

It will therefore be apparent that the method of GB0801406.0 could be applied to communication onwards from the second entity, i.e. once the first entity has agreed a key with the second entity, based on the quantum signal transmitted by the moveable key device, the second entity could communicate securely with the first entity regarding details of the quantum exchange between the second entity and a third entity. The first and third entities could then undertake a key agreement step to agree a new separate key. The method could be repeated iteratively to further nodes. If necessary at least one of those further nodes could be another moveable key device.

It will be clear that when the communication between the moveable key device and the first entity is encrypted there will be a need for the moveable key device to store at least one key in addition to the secret data, either a cryptographic key used to decrypt the communications or an identity key for use in an authentication step for QKD with the first entity. However there is only the need for the moveable key device to maintain one identity key—for authenticating with the first entity. This identity key can be automatically updated each time a new quantum key is established with the first entity, as is known in standard QKD, and hence identity key maintenance is not a major burden.

The present invention therefore provides a means of allowing end to end encrypted communications between a first entity and a second entity, the encryption being derived from QKD but applying where there is no chain of unbroken quantum links between the first and second entities.

The moveable key device may be a relatively small, portable device that can be easily moved from location to location which, in effect, acts as a key storage device—although the skilled person will appreciate that due to inherent errors in the quantum signal transmission and detection and also various error correction and privacy amplification steps carried out in the key agreement process the actual key finally agreed by the first and second entities could not be known in advance purely by looking at the secret data. The skilled person will also be aware that the key arrived at in the key agreement step may be subject to further processing before being used as a cryptographic key. For instance the key derived in the key agreement step may be used as a seed in a pseudo random number generator to derive a longer key.

Such a small moveable key device could therefore be sent via mail or other form of courier from the first entity to the second entity to allow update of a shared cryptographic key when needed. Provided the device is tamper proof and only transmits the quantum signal once the first entity can be certain that the only way to attempt to determine the key agreed between the parties would be to attempt to measure the quantum signal as it is transferred to the second entity or to intercept the quantum transmission and pretend to be the second entity—both approaches being detectable during the key agreement stage.

It is worth contrasting the present invention with a method of transmitting keys on a memory device which does not use a quantum transmission. Such a memory device could be loaded with secret data by the first entity in a secure environment and sent from the first entity to the second entity, either to be used as a key itself or in a key agreement step. The memory device would ideally be tamper proof, as with the moveable key device of the present invention. However without quantum transmission of the secret data any eavesdropper could guarantee correct recording of the data stored thereon and, even if the device was arranged to only transit the data once, could fabricate a replica and transmit the replica onwards. The second entity would be unaware the data had been read once already and use the data. The eavesdropper would then be able to determine the key and decode any subsequent transmissions.

To avoid this problem the memory device could be arranged to only transmit the data to the second entity if it could prove itself to be the second entity, i.e. it would require authentication. However this requires the memory device to contain the identity key of the second entity. An alternative would be to use encryption for the transmission of the data between the memory device and the second entity which again requires use a key—this time known to the second entity. In both cases the information providing the new key material is effectively protected by the old key and hence one may as well simply transmit the encrypted material over conventional communication links. This does mean however that if any one key is broken all future messages are exposed as the future key material can be intercepted and read using the existing key.

The method of the present invention therefore provides significant advantages for the transport of key material.

In some embodiments it is possible that the moveable key device may be incorporated in part of a vehicle. The vehicle may be any moving vehicle whether a land, sea, air or space vehicle and for the purposes of this specification a satellite shall be included in the meaning of the term vehicle. Thus the present invention may locate a moveable key device according to the present invention in a vehicle which can be moved so as to connect with the second entity. The second entity could itself be located on a vehicle for further movement. The present invention can therefore make use of scheduled vehicle movements to provide part of the key distribution. For instance if incorporated into aircraft making regular scheduled flights the present invention would provide an automatic means of long distance QKD. For example imagine a bank in London wanted to agree a new key with a sister bank in New York. The London bank may establish secure communications with a communication hub quantum node located at a London Airport which has links with an aircraft bound for New York. The communication between the bank and the airport communication hub may be secured by QKD over a direct quantum link between the bank and the hub or via one or more quantum nodes.

At least one moveable key device would be built into the aircraft. Apparatus for making a quantum link between the moveable key device and the airport hub could be located at each aircraft gate, for instance free space optics arranged to transmit an optical signal to/from an appropriate part of the aircraft from/to the airport infrastructure or a fibre optic link which can be plugged into the aircraft. There is also means for classical communication between the moveable key device and the communication hub. The bank sends a secure string of random numbers to the airport hub to be used for transmitting a quantum signal to the moveable key device. The bank then undertakes a key agreement step with the moveable key device and agrees a cryptographic key. The bank then sends the moveable key device a secret data string encrypted using the said cryptographic key. The moveable key device may also receive different secret data strings from different organisations and store them in different parts of its memory or distinct memory units and/or there may be a plurality of moveable key devices.

The aircraft will then eventually depart London and fly to New York where it lands at an airport. Once it is in position at the gate a quantum link is made between the moveable key device and the New York airport communication hub. At some point the moveable key device communicates with this communication hub that it has data from the London bank and then transmits quantum signal based on the secret data held in memory from the London bank. The New York airport communication hub attempts to detect the quantum signal and ends up with a set of measured data. It then communicates on classical channels with the London bank. The bank and the New York airport communication hub authenticate each other based on shared identity keys (as for instance established in an initial registration process and then updated each time the key is used) and then undertake a key agreement step. Assuming there is no interfere the bank and the New York airport communication hub agree a quantum key. The bank next instructs the communication hub to establish a quantum link with the New York bank and sends the hub a series of random numbers to be used as the basis of the quantum signal, the random number string being encrypted by the quantum key. The New York bank attempts to measure the quantum signal and then undertakes an authentication and key agreement step directly with the London Bank. The London bank knows the quantum signal sent and hence, assuming no interference, the authentication and key agreement is successful. The London and New York banks thus establish a new cryptographic key which can be used for end to end encryption of future communication and which was established using QKD techniques, even thought there is no functioning quantum link, whether direct or otherwise, between London and New York.

Figure 2A:
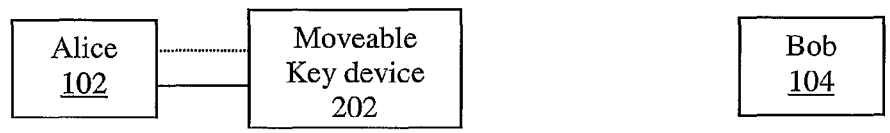
Figure 2B:
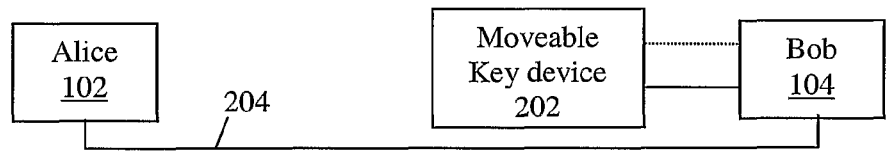
Figure 3:
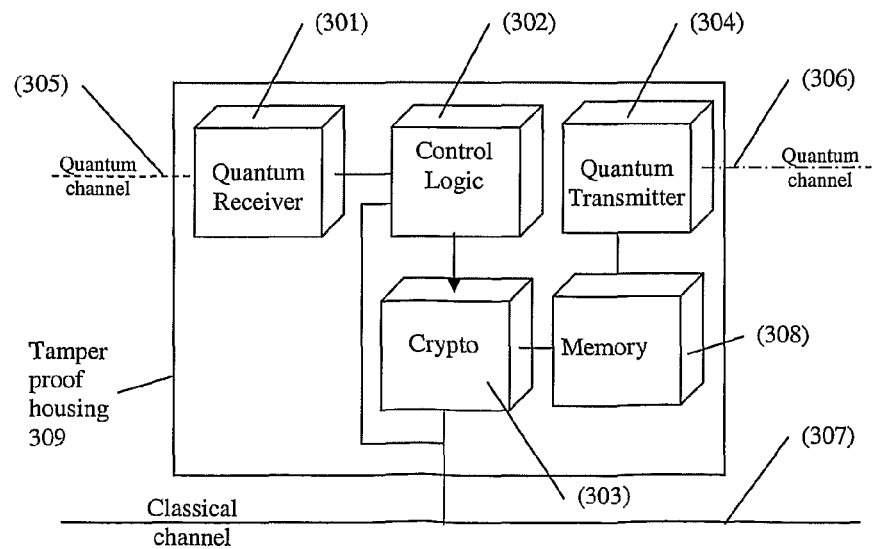

The invention will now be described by way of example only with reference to the following drawings, of which:

FIG. 1 shows a schematic of a standard QKD transmitter (Alice) and receiver (Bob) arranged over a single optical link, FIG. 2 shows a distributed QKD transmitter as described in co-pending patent application GB0801406.0 and FIG. 3 illustrates a moveable key device of the present invention.

Referring to FIG. 1 the basic structure of a standard QKD system is shown. The quantum transmitter 102, typically referred to as Alice, is optically linked to the quantum receiver 104, typically referred to a Bob. The optical link may be through free space or any suitable waveguide but for illustration will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. The skilled person will readily appreciate that there are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared key as is well known. Note as used herein the term logic means any suitable device arrangement for performing the key agreement protocols. The control logic may be a suitable designed ASIC or a suitably programmed FPGA. The control logic could also be a suitably programmed microprocessor.

In establishing a common shared key, Alice control logic 110 and Bob control logic 118 mutually authenticate each other in order to exclude the possibility of a man-in-the-middle attack. Such authentication is a well known procedure and may, for example, involve the two parties applying digital signatures to the messages they exchange. The digital signatures are generated and validated by means of a cryptographic key referred to as the identity key for the link. This may be based on symmetric cryptographic techniques in which case the identity key is a secret value known only to both parties.

Having used QKD to establish a new common shared key value, and mutually authenticated each other, Alice control logic 110 and Bob control logic 118 use that value in part to update the secret identity key and in part as an encryption key for protecting subsequent communication between them.

QKD as described in relation to FIG. 1 is a well known technique but has the limitation that it only operates over a direct optical link between Alice and Bob. Further the distance of that link is limited due to losses inherent in using single photon signals issues such as polarisation mode dispersion in the optical fibre potentially destroying the encoding of the photons.

The present invention allows QKD to be applied between Alice and Bob in the absence of a direct quantum link between them. FIG. 2 illustrates the principle of the present invention. At a first time, as shown in FIG. 2a a quantum link and a classical communication link is established between Alice 102 and a moveable key device 104. As mentioned above the quantum link could be free space or via an appropriate waveguide such as fibre. The classical link could also be optical and carried via the same medium as the quantum link, for instance at a different wavelength, or the classical link could be rf or direct electrical connection. The moveable key device contains a Bob unit within itself and also a secure memory. The structure of the moveable key device will be described in more detail below.

When the moveable key device 202 is connected to Alice 102 as shown in FIG. 2a the loading of the key device can begin. First Alice and the moveable key device agree a first quantum key using QKD as described with respect to FIG. 1.

Alice 102 then transmits a series of random numbers to the moveable key device 202, the random numbers being encrypted by the first quantum key. The moveable key device then stores the random numbers transmitted by Alice in a secure memory. The random numbers may be decrypted before storage or may be stored in an encrypted form to be decrypted when needed using the first quantum key.

It will be apparent to the skilled person that in agreeing the first quantum key Alice may need to authenticate the moveable key device to ensure that she is talking to the moveable key device and not to a man-in-the-middle attacker. The moveable key device therefore has an identity key which is known to Alice. As part of the authentication of the first quantum key the identity key of the moveable key device is updated. It is not actually necessary for the moveable key device to authenticate Alice as it is simply a relay device and ultimately it is Bob who is concerned that the data originated from Alice and not someone pretending to be Alice. However in some instances it might be desired to perform mutual authentication. This may for instance prevent the moveable key device from being overwritten by anyone other than Alice.

In some circumstances it may not be necessary to authenticate at all, for instance were the moveable key device physically co-located with the Alice device so that an operator could clearly see that Alice was communicating with the moveable key device. In such an arrangement however the need for any encryption at all for communications between Alice and the moveable key device may be removed and Alice could simply communicate random numbers to the moveable key device in the clear. Also, whilst the foregoing description has described the use of QKD for establishing a quantum key other encryption techniques could be used to encrypt the delivery of the random numbers from Alice to the moveable key device.

The moveable key device 202 is then moved to a different location, as shown in FIG. 2b, where there is a quantum link and a classical channel with Bob 104. The quantum channel link may be established through free space by aligning the moveable key device accurately with an optical receiver of Bob. The moveable key device could be shaped so as to fit a holder with good alignment. Alternatively a fibre or other waveguide interface device could be attached or otherwise connected to the moveable key device so as to provide a waveguide link for the quantum channel.

Once a calibration procedure has been performed—which may be any standard type of initialisation/calibration procedure for the appropriate QKD protocol—the moveable key device, which contains a quantum transmitter, uses the stored random numbers to generate a quantum signal. For instance, again following the BB84 type protocol the random numbers may be used to determine the encoding basis, say rectilinear or diagonal polarisation, applied to each photon as well as the data value to be encoded, 1 or 0. The quantum signal is transmitted via the quantum channel to Bob. Once the key device has transmitted the quantum signal it deletes the random number sequence from memory and then is ready to be loaded with a new random number.

Bob 104 attempts to detect received photons and choose an encoding basis at random to measure the photon data value, exactly as described above with reference to FIG. 1. Once the signal has been detected, Bob then starts the error correction, privacy amplification and authentications steps as is known in QKD. However these steps are performed with Alice 102 via a classical link 204 and not with the moveable key device. Alice and Bob, the end to end users, therefore authenticate each other and thus Alice can be certain the random numbers were used in the quantum transmission to Bob and Bob can be sure the numbers used originated from Alice. They can therefore agree a cryptographic key, or at least material that can be used as the basis of a cryptographic key, which can be used for end to end encryption of data traffic between them via the classic channel 204.

The structure of the moveable key device is shown in more detail in FIG. 3. A quantum receiver 301 is arranged to receive incoming quantum signals on an incoming quantum channel 305 when established. Guiding/interface optics (not shown) are provided to establish the incoming quantum link. Control logic 302 receives the quantum signals from the quantum receiver 301. The control logic 302 communicates with the party sending the quantum signal prior to the quantum exchange for calibration and synchronisation purposes and then afterwards undertakes sifting, error detection and privacy amplification of the data. The communication is performed via classical channel 307. The control logic also performs an authentication step if necessary.

Control logic 302 therefore can agree a quantum key with an external Alice in response to a detected quantum signal. This key is loaded into crypto unit 303. Crypto 303 receives a communication of a random number string which is encrypted using the quantum key and decrypts it for storage in memory 308. In this embodiment the random numbers are thus stored in the clear however the encrypted data could be stored if required. The data can be stored in the clear as all the mentioned components are located in a tamper proof housing 309. If the housing is opened by any means at any time all data stored in control logic 302, crypto 303 and memory 308 is irretrievably deleted. Housing 309 also provides shielding of the components to prevent emissions and also prevent probing.

When the moveable key device is later connected to an outgoing quantum channel 306 the data stored in memory 308 is transferred to quantum transmitter 304 and used to transmit an appropriate quantum signal on the outgoing channel 306. The transfer of data from the memory results in irretrievable deletion of that data from the memory. Thus the data can be used once and once only.

The moveable key device as described above may be relatively small and therefore easily portable. It may be arranged to be directly plugged into a computer device, i.e. like a memory stick or something similar. In which case the quantum receiver and crypto may be omitted as the person loading the device with data could trust a direct transfer of information into the device. All that would be important would be a quantum transfer of information out of the device occurring once and once only.

The invention claimed is:

1. A method of key distribution from a first entity to a second entity comprising the steps of: the first entity communicating with a moveable key device so as to share a secret data with said moveable key device, relocating said moveable key device to a location having a quantum link with said second entity, transmitting a quantum signal from said moveable key device to said second entity on said quantum link, the quantum signal being based on said secret data; and said first entity and said second entity undertaking key agreement based on the quantum signal received by the second entity.

2. A method as claimed in claim 1 wherein said secret data comprises at least one string of random numbers.

3. A method as claimed in claim 1 wherein the secret data is transmitted from the first entity to the moveable key device.

4. A method as claimed in claim 1 wherein the quantum link with the second entity comprises one or more of a free space path and a path through a suitable waveguide or waveguides.

5. A method as claimed in claim 1 wherein the quantum signal comprises a series of suitably modulated single photons.

6. A method as claimed in claim 1 wherein the step of undertaking key agreement comprises the first entity and second entity performing authentication.

7. A method as claimed in claim 1 wherein the moveable key device transmits a quantum signal based on the secret data once and only once.

8. A method as claimed in claim 7 comprising the step of deleting the secret data as it is used.

9. A method as claimed in claim 1 wherein the moveable key device comprises a secure, tamper proof housing.

10. A method as claimed in claim 1 wherein the communication between the first entity and the moveable key device is encrypted.

11. A method as claimed in claim 10 wherein the communication between the first entity and the moveable key device is protected by encrypting it with a quantum key derived by quantum key distribution between the first entity and the moveable key device.

12. A method as claimed in claim 10 wherein the moveable key device is linked to the first entity via at least one quantum node.

13. A method as claimed in claim 1 further comprising the step, after the first and second entity have undertaken key agreement, of the first entity and second entity communicating securely regarding details of a quantum exchange between the second entity and a third entity.

14. A method as claimed in claim 13 further comprising the step of the first and third entities undertake a key agreement step to agree a new key.

15. A method as claimed in claim 1 wherein the moveable key device is a portable device.

16. A method as claimed in claim 15 wherein the moveable key device is relocated by post or courier.

17. A method as claimed in claim 1 wherein the moveable key device is incorporated within a vehicle.

18. A method as claimed in claim 17 wherein the moveable key device is incorporated within an aircraft.

19. A method as claimed in claim 1, wherein the secret data is stored at said movable key device.

20. A method as claimed in claim 1, wherein the step of relocating said movable key device comprises relocating the movable key device from a location that does not have a quantum link to the second entity.

* * * * *